United States Patent
Yonezawa et al.

(10) Patent No.: US 6,185,998 B1
(45) Date of Patent: *Feb. 13, 2001

(54) HEAT SENSITIVE FLOW AMOUNT SENSOR AND INLET SYSTEM OF INTERNAL COMBUSTION ENGINE

(75) Inventors: Fumiyoshi Yonezawa; Tomoya Yamakawa; Hiroyuki Uramachi, all of Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/946,918

(22) Filed: Oct. 9, 1997

(30) Foreign Application Priority Data

May 28, 1997 (JP) .................................. 9-138673

(51) Int. Cl.[7] ............................................ G01M 15/00
(52) U.S. Cl. ................................................... 73/118.2
(58) Field of Search .............................. 73/118.2, 118.1, 73/116, 117.3

(56) References Cited

U.S. PATENT DOCUMENTS

| | | | |
|---|---|---|---|
| 3,975,951 | * 8/1976 | Kohama et al. | 73/116 |
| 4,067,233 | * 1/1978 | Obayashi et al. | 73/116 |
| 4,089,214 | * 5/1978 | Egami et al. | 73/116 |
| 4,448,064 | * 5/1984 | Asayama | 73/118.2 |
| 4,449,401 | 5/1984 | Kaiser et al. | 73/202 |
| 4,785,662 | * 11/1988 | Ohta et al. | 73/118.2 |
| 4,891,978 | * 1/1990 | Sumal | 73/118.2 |
| 4,907,446 | * 3/1990 | Inada et al. | 73/118.2 |
| 4,922,879 | * 5/1990 | Kaji et al. | 73/118.2 |
| 5,107,812 | * 4/1992 | Takamoto et al. | 73/118.2 |
| 5,209,113 | * 5/1993 | Sawada et al. | 73/118.2 |
| 5,253,517 | * 10/1993 | Molin et al. | 73/118.2 |
| 5,303,584 | * 4/1994 | Ogasawara et al. | 73/118.2 |
| 5,329,812 | * 7/1994 | Tada et al. | 73/118.2 |
| 5,546,794 | * 8/1996 | Kuhn et al. | 73/118.2 |
| 5,654,506 | * 8/1997 | Yoneda et al. | 73/118.2 |
| 5,712,425 | * 1/1998 | Hecht et al. | 73/118.2 |
| 5,789,673 | * 8/1998 | Igarashi et al. | 73/118.2 |
| 5,804,718 | * 9/1998 | Nagasaka et al. | 73/118.2 |

FOREIGN PATENT DOCUMENTS

| | | |
|---|---|---|
| 0 313 089 | 4/1989 | (EP) . |
| 0 386 966 | 9/1990 | (EP) . |
| 1-36937 | 2/1989 | (JP) . |
| 4-318425 | 11/1992 | (JP) . |

* cited by examiner

*Primary Examiner*—Eric S. McCall
(74) *Attorney, Agent, or Firm*—Sughrue, Mion, Zinn, Macpeak & Seas, PLLC

(57) ABSTRACT

A heat sensitive flow amount sensor of the invention includes a measuring pipe disposed in the inlet pipe of an internal combustion engine, an air flow amount detecting element disposed in the measuring pipe for detecting the flow amount of intake air flowing in the inlet pipe making use of the fact that a quantity of heat loss corresponds to the flow amount of the intake air, and a straightening member disposed on the outer periphery of the measuring pipe along the axial line thereof for straightening the intake air flowing into the measuring pipe by straightening the intake air flowing in the inlet pipe. With this arrangement, even if the heat sensitive flow amount sensor is disposed in the vicinity of a throttle valve, the measuring accuracy of the flow amount of air is not lowered and the size of an internal combustion engine can be reduced by the employment of the heat sensitive flow amount sensor.

12 Claims, 9 Drawing Sheets

HEAT SENSITIVE FLOW AMOUNT SENSOR AND INLET SYSTEM OF INTERNAL COMBUSTION ENGINE

BACKGROUND OF THE INVENTION

1. Field of the Invention

The present invention relates to a heat sensitive flow amount sensor for measuring the amount of intake air flowing, for example, in the inlet pipe of an internal combustion engine and an inlet system of an internal combustion engine.

2. Description of the Related Art

FIG. 16 is a side sectional view of the main portion of an inlet system of an internal combustion engine disclosed in Japanese Patent Application Laid-open No. 64-36937. FIG. 16, shows an inlet pipe 1 with a throttle valve 2 disposed therein which turns in accordance with the amount of depression of an accelerator pedal to thereby regulate the air flow amount to be taken into the cylinders (not shown). A bypass 3 is disposed upstream of the throttle valve 2 and when the internal combustion engine is in an idling state or the like and the throttle valve 2 is totally closed, intake air is introduced into the cylinders through the bypass 3. Further, a heat sensitive flow amount sensor 4 is disposed upstream of the throttle valve 2 in the inlet pipe 1 to measure the an intake air flow amount in the inlet pipe 1.

The heat sensitive flow amount sensor 4 includes: a cylindrical measuring pipe 5, a column 6 for supporting the measuring pipe 5, an air flow amount sensing element 7 which is disposed in the measuring pipe 5 and heated with its resistance value changing according to the temperature, a heat sensitive resistive element (not shown) which is disposed in the inlet pipe 1 whose resistance value changes according to the temperature to thereby detect the temperature of intake air, and a control circuit 9 coupled with the column 6. The control circuit 9 is electrically connected to the air flow amount sensing element 7 and the heat sensitive resistive element, and heats the air flow amount sensing element 7 so that it always maintains a certain temperature difference with respect to the temperature of the intake air in the inlet pipe 1 detected by said heat sensitive resistive element, as well as converts a current corresponding to the heating thereof into an output voltage signal.

In the inlet system of the internal combustion engine arranged as described above, a portion of the intake air which has passed through an air cleaner (not shown) and flowed into the inlet pipe 1 flows into the measuring pipe 5. At that time, although heat is taken from the air flow amount sensing element 7 in accordance with the flow amount of the intake air, the air flow amount sensing element 7 is subjected to constant temperature difference control by the control circuit 9, so that it always maintains the certain temperature difference with respect to the temperature of the intake air detected by the heat sensitive resistive element. Since the control circuit 9 converts the current corresponding to the heating of the air flow amount sensing element 7 into the output voltage signal corresponding to the air flow amount, it can determine the amount of the intake air in the inlet pipe 1 from the output voltage signal. In this way, the amount of air flowing in the inlet pipe 1 is measured in the measuring pipe 5 of the heat sensitive flow amount sensor 4. The air flow in the inlet pipe 1 is affected by the degree which the throttle valve 2 is opened, and by the bypass 3, etc, each of which disturbs the air flowing into the measuring pipe 5 and reduces the accuracy of the measurement of the air flow. Therefore, the heat sensitive flow amount sensor 4 must be installed as far away from the throttle valve 2 as possible to reduce the effect of the above factors as much as possible, and thus accurately measure the flow amount of intake air.

The conventional inlet system of an internal combustion engine has the following problems: since the heat sensitive flow amount sensor 4 must be installed as far way from the throttle valve 2 as possible to accurately measure the flow amount of intake air, the inlet system of the internal combustion engine is increased in size and, the space where the internal combustion engine is mounted increases as does the manufacturing cost.

An object of the present invention is to solve the above problem and to provide a heat sensitive flow amount sensor which can measure an air flow amount without lowering an measuring accuracy even if the sensor is installed in the vicinity of, for example, a throttle valve, and contribute to the reduction in size of an internal combustion engine, and acheive a cost reduction for a heat sensitive flow amount senosr and the inlet system of an internal combustion engine.

SUMMARY OF THE INVENTION

A heat sensitive flow amount sensor according to one aspect of the present invention comprises a measuring pipe disposed in a main pipe, a flow amount detecting element disposed in the measuring pipe for detecting the amount of a gas flowing in the main pipe, and a straightening member disposed on the measuring pipe along the axial line of the measuring pipe for straightening the gas flowing into the measuring pipe by straightening the gas flowing in the main pipe.

In one form of the heat sensitive flow amount sensor, a plurality of straightening members are disposed at intervals in the peripheral direction of the measuring pipe.

In another form of the heat sensitive flow amount sensor, an upstream edge of the straightening member is disposed downstream of an upstream end of the measuring pipe.

In still another form of the heat sensitive flow amount sensor, the corner of the straightening member is formed on the upstream side thereof as a curved surface.

An inlet system of an internal combustion engine according to another aspect of the present invention comprises an inlet pipe in which intake air flows, a measuring pipe disposed in the inlet pipe, an air flow amount detecting element disposed in the measuring pipe for detecting the amount of the intake air flowing in the inlet pipe, a straightening member disposed inside of the inlet pipe along the axial line of the measuring pipe for straightening the intake air flowing into the measuring pipe by straightening the intake air flowing in the inlet pipe.

In one form of the inlet system of an internal combustion engine, a plurality of straightening members are disposed at intervals in the peripheral direction of the inlet pipe.

In another form of the inlet system of an internal combustion engine, an upstream edge of the straightening member is disposed downstream of an upstream of the measuring pipe.

In still another form of the inlet system of an internal combustion engine, the corner of the straightening member is formed on the upstream side thereof as a curved surface.

In a further form of the inlet system of the internal combustion engine, a throttle valve is disposed in the inlet pipe in the vicinity of the measuring pipe.

DESCRIPTION OF THE PREFERRED EMBODIMENT

Embodiment 1

Figure 1:
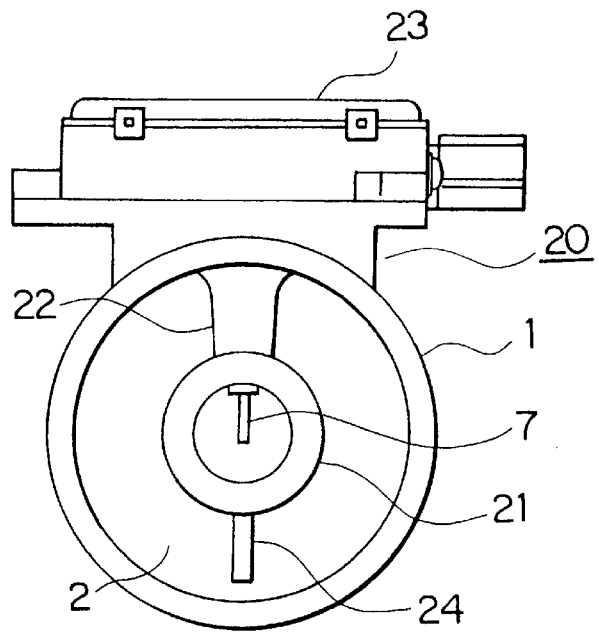
FIG. 1 is a front elevational view of a heat sensitive flow amount sensor of an embodiment 1 of the present invention viewed from the upstream side.
Figure 2:
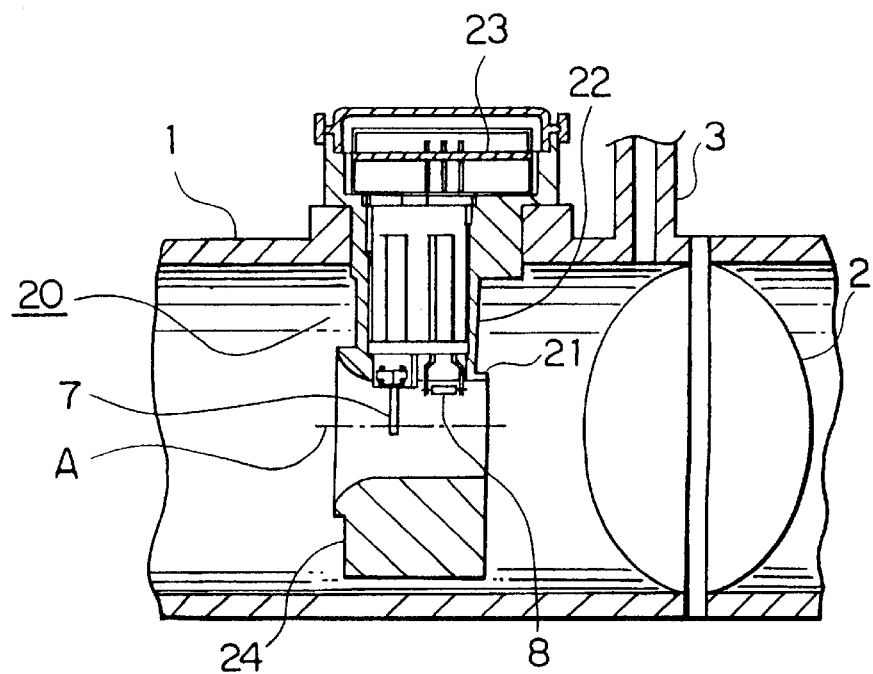
FIG. 2 is a side sectional view of the main-portion of an inlet system of an internal combustion engine on which the heat sensitive flow amount sensor shown in FIG. 1 is assembled.

FIG. 1 is a front elevational view of a heat sensitive flow amount sensor of an embodiment 1 of the present invention viewed from the upstream side and FIG. 2 is a side sectional view of the main portion of an inlet system of an internal combustion engine on which the heat sensitive flow amount sensor shown in FIG. 1 is assembled.

An inlet pipe 1 in which intake air flows has a throttle valve 2 disposed therein which turns in accordance with the amount of depression of the accelerator pedal to thereby regulate the amount of air taken into cylinders (not shown). A heat sensitive flow amount sensor 20 is disposed upstream of the throttle valve 2 in the inlet pipe 1 to measure the amount of intake air flowing in the inlet pipe 1 which is a main pipe.

The heat sensitive flow amount sensor 20 includes: a measuring pipe 21 whose diameter is enlarged on the upstream side of the intake air, a column 22 for supporting the measuring pipe 21, an air flow amount sensing element 7 which is disposed in the measuring pipe 21 and heated with its resistance value changing according to the temperature, a heat sensitive resistive element 8 which is disposed in the vicinity of the air flow amount sensing element 7 and whose resistance value changes according to the temperature to thereby detect the temperature of the intake air, a control circuit 23 coupled with the column 22 and a rectangular straightening member 24 which is mounted on the outer peripheral surface of the measuring pipe 21 and extends along the axial line A of the measuring pipe 21.

The control circuit 23 is electrically connected to the air flow amount sensing element 7 and the heat sensitive resistive element 8 and heats the air flow amount sensing element 7 so that it always maintains a certain temperature difference with respect to the temperature of the intake air in the inlet pipe 1 detected by the heat sensitive resistive element 8, as well as converts a current corresponding to the heating thereof into an output voltage signal.

In the inlet system of the internal combustion engine arranged as described above, a portion of air which has passed through an air cleaner (not shown) and flowed into the inlet pipe 1 flows into the measuring pipe 21. At the time, although heat is taken from the air flow amount sensing element 7 according to the amount of intake air flow, the air flow amount sensing element 7 is subjected to constant temperature difference control by the control circuit 23 so that it always maitains a certain temperature difference with respect to the temperature of the intake air detected by the heat sensitive resistive element 8. The control circuit 23 converts a current corresponding to the heating of the air flow amount sensing element 7 into an output voltage signal, and can determine the amount of the intake air flow in the inlet pipe 1 from the output voltage signal.

Incidentally, although there is a tendency that an air flow having a vector in a direction which is inclined with respect to the axial line A of the measuring pipe 21 is made in the inlet pipe 1 by the opening of the throttle valve 2 and by a bypass 3; air flow is maintained in the inlet pipe 1 along the axial line A by the straightening action of the straightening member 24. As a result, the air flow amount sensing element 7 in the measuring pipe 21 is less affected by the disturbance of the air flow caused by the throttle valve 2 and the bypass 3, so that the amount of the air flow can be more accurately detected.

Figure 3:
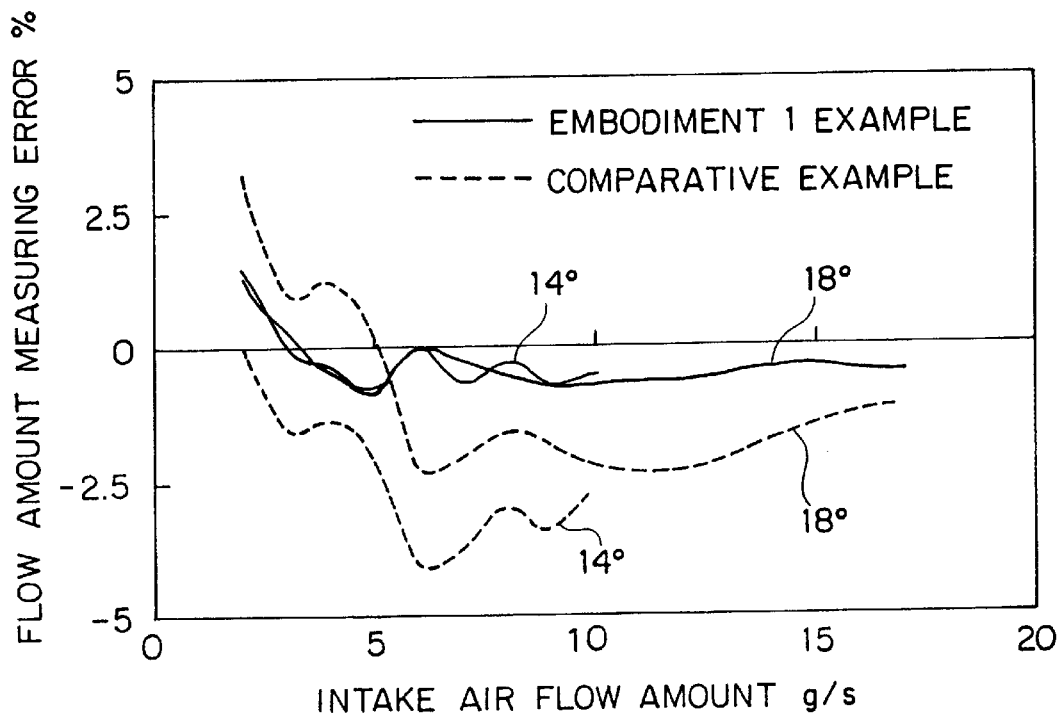
FIG. 3 is graph showing the relationship between intake air amounts and flow amount measurement errors when the amount of air flowing in an inlet pipe is measured by the heat sensitive flow amount sensor of the embodiment 1 and a heat sensitive flow amount sensor as an comparative example.

FIG. 3 shows the relationship between the intake air flow amounts and the flow amount measurement errors measured by the respective sensors, when the heat sensitive flow amount sensor 20 (embodiment 1) and a heat sensitive flow amount sensor without the straightening member 24 (comparative example) are disposed in the vicinity of the throttle valve 2, respectively, and the amount of the intake air flow is actually measured by the respective sensors.

In FIG. 3, the measurement is executed when the degree of opening of the throttle valve 2 is set to 14° and 18° and it can be determined from the result of the measurement that the flow amount measurement error of the heat sensitive flow amount sensor 20 is less than that of the comparative example.

Embodiment 2

Figure 4:
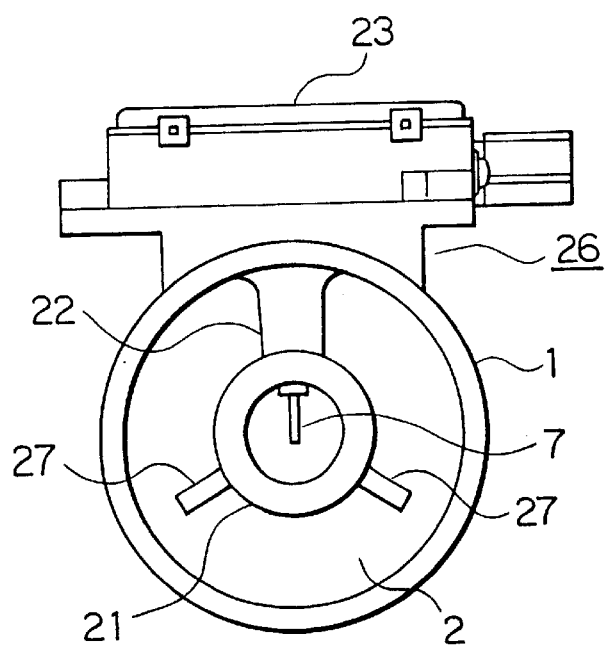
FIG. 4 is a front elevational view of a heat sensitive flow amount sensor of an embodiment 2 viewed from the upstream side.

FIG. 4 is a front elevational view of a heat sensitive flow amount sensor 26 of embodiment 2 of the present invention viewed from the upstream side. The heat sensitive flow amount sensor 26 is different from the heat sensitive flow amount sensor 20 of the embodiment 1 in that two rectangular straightening members 27, which extend along the axial line A of the measuring pipe 21, and a column 22 are mounted on the outer peripheral surface of a measuring pipe 21 at equal intervals. Note, the same numerals as used in the embodiment 1 are used in the embodiment 2 to denote the same or corresponding portions and the description thereof is omitted.

In the heat sensitive flow amount sensor 26 of the embodiment 2, the air flow along the axial line is stablized in the inlet pipe 1 by the straightening action of the plurality of straightening members 27. Therefore the air flow amount sensing element 7 in the measuring pipe 21 is less affected by the disturbance of the air flow caused by the throttle valve 2, so that the amount of the air flow in the inlet pipe 1 can be more accurately measured.

Embodiment 3

Figure 5:
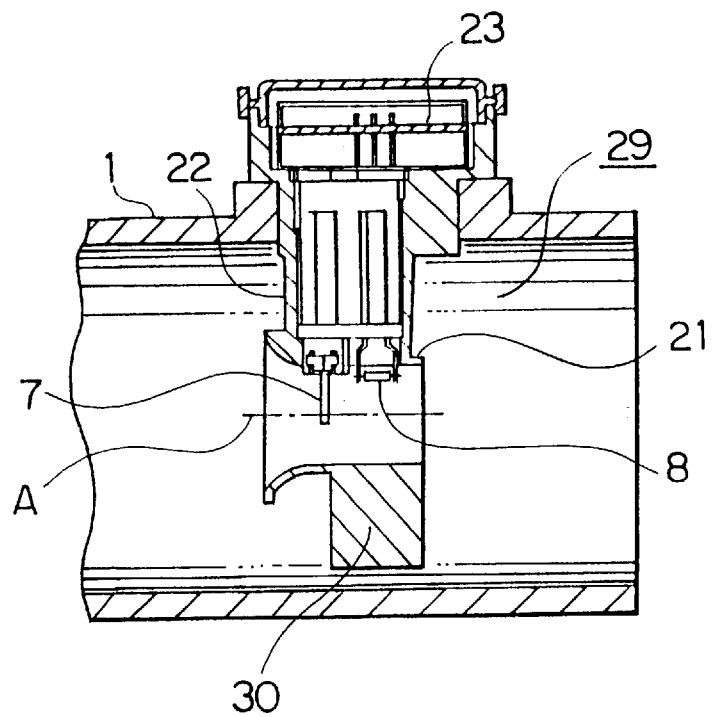
FIG. 5 is a side sectional view of the main portion of an inlet system of an internal combustion engine on which a heat sensitive flow amount sensor of an embodiment 3 is assembled.

FIG. 5 is a side sectional view of the main portion of an inlet system of an internal combustion engine on which a heat sensitive flow amount sensor 29 of embodiment 3 of the present invention is assembled. In the heat sensitive flow amount sensor 29, a upstream edge of a sheet-like straightening member 30 is disposed downstream of an upstream end of a measuring pipe 21.

Since the surface area of the straightening member 30 is smaller than that of the straightening member 24 of the embodiment 1, which is disposed over the entire length of the measuring pipe 5, the frictional resistance caused when the intake air flowing in an inlet pipe 1 comes into contact with the straightening member 30 is reduced accordingly, so that the pressure loss of the intake air flowing in the inlet pipe 1 can be lowered.

Embodiment 4

Figure 6A:
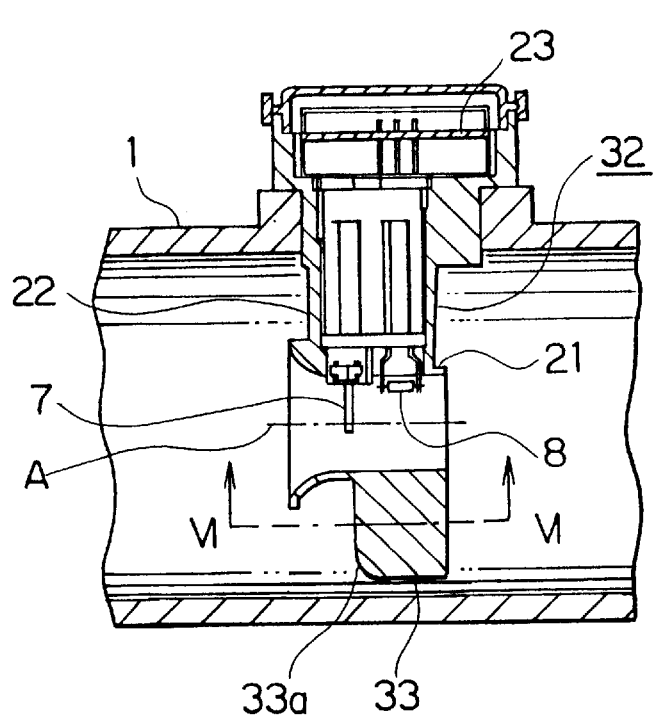
FIG. 6(a) is a side sectional view of the main portion of an inlet system of an internal combustion engine on which a heat sensitive flow amount sensor of an embodiment 4 is assembled.
Figure 6B:
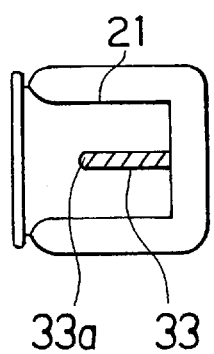
FIG. 6(b) is a sectional view taken along the line VI—VI of FIG. 6(a)

FIG. 6(a) a side sectional view of the main portion of an inlet system of an internal combustion engine on which a heat sensitive flow amount sensor 32 of embodiment 4 of the present invention is assembled and FIG. 6(b) is a sectional view taken along the line VI—VI of FIG. 6(a). In FIG. 6, the corner 33a of a straightening member 33 is formed on the upstream side thereof as a curved surface. As a result, intake air which collides against the corner 33a of the straightening member 33 smoothly flows along the curved corner 33a, so that the pressure loss of the intake air can be lowered.

Embodiment 5

Figure 7:
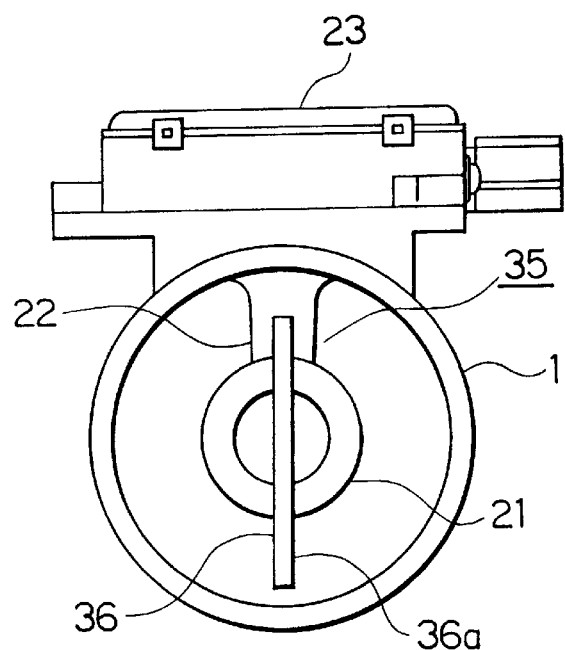
FIG. 7 is a front elevational view of a heat sensitive flow amount sensor of an embodiment 5 viewed from the upstream side.
Figure 8:
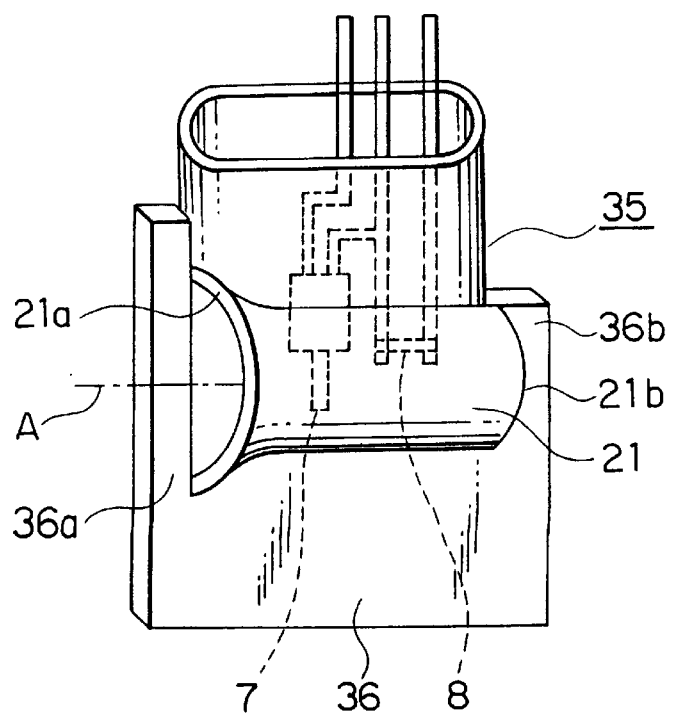
FIG. 8 is a perspective view of the main portion of the heat sensitive flow amount sensor shown in FIG. 7.

FIG. 7 is a front elevational view of a heat sensitive flow amount sensor 35 of embodiment 5 of the present invention viewed from the upstream side and FIG. 8 is a perspective view of the main portion in FIG. 7. In the drawings, a straightening member 36 is mounted to a measuring pipe 21 having an upstream opening 21a and a downstream opening 21b. An upstream straightening portion 36a is formed on the upstream side of the straightening member 36, the straightening portion 36a extending in the diametrical direction of the upstream opening 21a perpendicular to the axial line A of a measuring pipe 21. Further, there is also formed a downstream straightening portion 36b on the downstream side of the straightening member 36, the straightening portion 36b extending in the diametrical direction of the downstream opening 21b perpendicular to the axial line A of the measuring pipe 21.

In the heat sensitive flow amount sensor 35 of the embodiment 5, air flow in the direction along the axial line A is stablized in the measuring pipe 21 by the straightening actions of the upstream straightening portion 36a and the downstream straightening portion 36b. Thus, since it becomes difficult for the air flow amount sensing element 7 in the measuring pipe 21 to be affected by the disturbance of air flow caused by a throttle valve 2 and a bypass 3; the amount of the intake air flow in an inlet pipe 1 can be more accurately measured.

Note, although the embodiment 1 though embodiment 5 describe the case when the heat sensitive flow amount sensor 20, 26, 29, 32 or 35 is mounted on the inlet pipe 1 to thereby measure the amount of the intake air flowing in the inlet pipe 1; the heat sensitive flow sensor may be mounted on the main pipe instead of the inlet pipe to measure the amount of a gas which flows therein.

Embodiment 6

Figure 9:
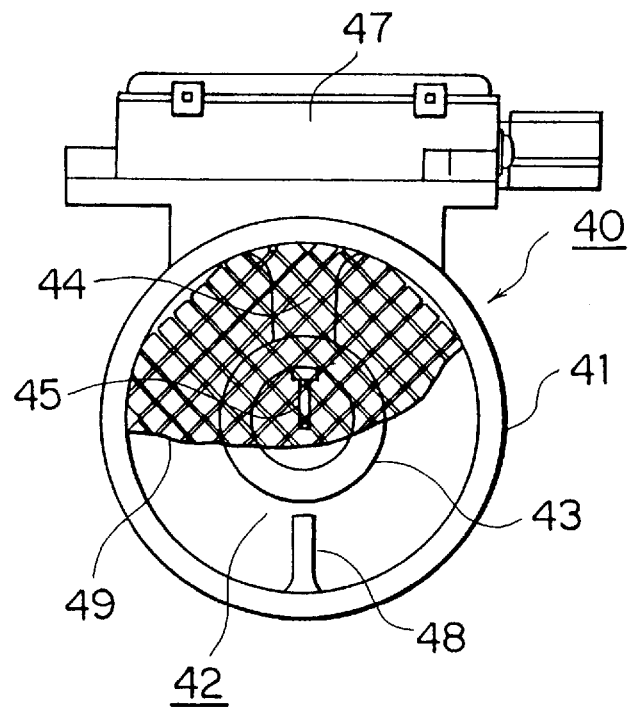
FIG. 9 is a front elevational view of an inlet system of an internal combustion engine of an embodiment 6 viewed from the upstream side.
Figure 10:
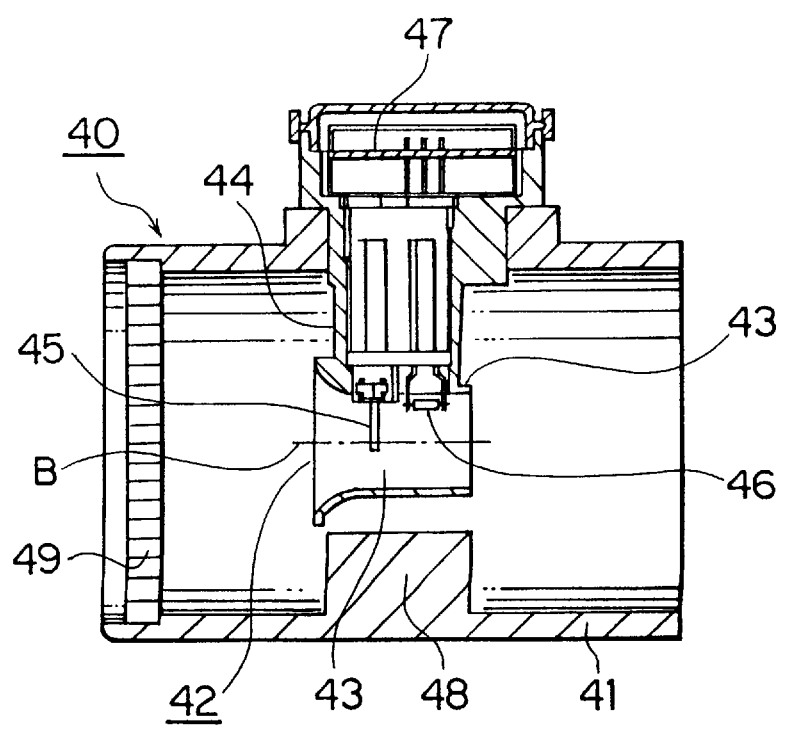
FIG. 10 is a side sectional view of the inlet system of the internal combustion engine shown in FIG. 9.

FIG. 9 is a front elevational view of an inlet system 40 of an internal combustion engine of embodiment 6 of the present invention viewed from the upstream side, and FIG. 10 is a side sectional view of FIG. 9.

The inlet system 40 of the internal combustion engine includes an inlet pipe 41 in which a straightener 49 for straightening the air flow is provided, and a heat sensitive flow amount sensor 42 disposed downstream of the straightener 49 for measuring the flow amount of intake air in the inlet pipe 41.

The heat sensitive flow amount sensor 42 includes: a measuring pipe 43 disposed in the inlet pipe 41 and having an enlarged diameter on the upstream side of the intake air, a column 44 for supporting the measuring pipe 43, an air flow amount sensing element 45 which is disposed in the measuring pipe 43 and heated with its resistance value changing according to the temperature, a heat sensitive resistive element 46 which is disposed in the vicinity of the air flow amount sensing element 45 and whose resistance value changes according to the temperature to thereby detect the temperature of the intake air, and a control circuit 47 coupled with the column 44. The control circuit 47 is electrically connected to the air flow amount sensing element 45 and the heat sensitive resistive element 46 and heats the air flow amount sensing element 45 so that it always maintains a certain temperature difference with respect to the temperature of the intake air in the inlet pipe 41 detected by the heat sensitive resistive element 46, as well as converts a current corresponding to the heating thereof into an output voltage signal.

A rectangular straightening member 48 which extends in parallel with an axial line B is disposed on the inner peripheral surface of the inlet pipe 41 just below the measuring pipe 43.

In the inlet system 40 of the internal combustion engine arranged as described above, a portion of air in the inlet pipe 41 which has passed through the straightener 49, which straightens the air flow, flows into the measuring pipe 43. At that time, although heat is taken from the air flow amount sensing element 45 according to the amount intake air flow: the air flow amount sensing element 45 is subjected to constant temperature difference control by the control circuit 47 so that it always maintains a certain temperature difference with respect to the temperature of the intake air detected by the heat sensitive resistive element 46. The control circuit 47 converts a current corresponding to the heating of the air flow amount sensing element 45 into an output voltage signal, and can determine the intake air flow amount in the inlet pipe 1 from the output voltage signal.

Incidentally, although there is a tendency for air flow having a vector in a direction which is inclined with respect to the axial line B of the measuring pipe 43 to be made in the inlet pipe 41 depending upon the opening of a throttle valve 2 and a bypass 3; an air flow is maintained in the inlet pipe 1 along the axial line B by the straightening action of the straightening member 48. As a result, the air flow amount sensing element 45 in the measuring pipe 43 is less affected by the disturbance of the air flow caused by the throttle valve 2, so that the amount of the air flow in the inlet pipe 41 can be more accurately detected.

Embodiment 7

Figure 11:
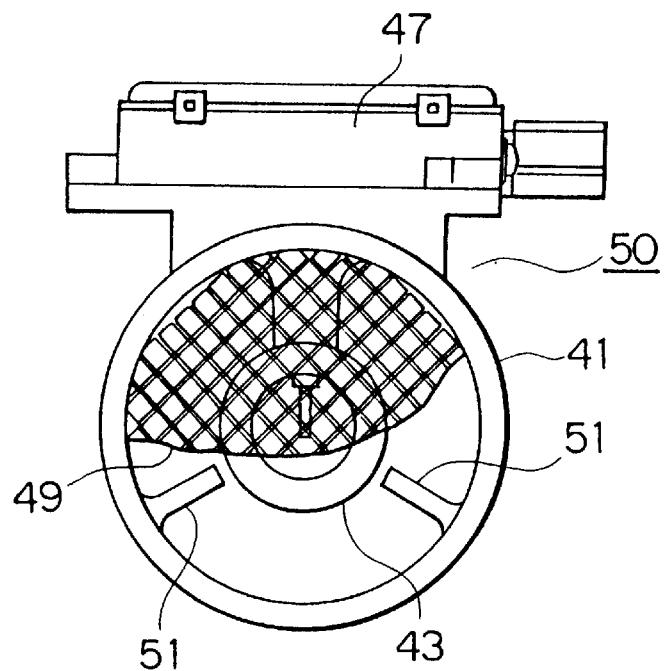
FIG. 11 is a front elevational view of an inlet system of an internal combustion engine of an embodiment 7 viewed from the upstream side.

FIG. 11 is a front elevational view of an inlet system 50 of an internal combustion engine of an embodiment 7 of the present invention viewed from an upstream side. The inlet system 50 is different from the inlet system 40 of the internal combustion engine of the embodiment 6 in that two rectangular straightening members 51, which extend along the axial line B of a measuring pipe 43, and a column 44 are mounted on the inner peripheral surface of an inlet pipe 41 at equal intervals.

In the inlet system 50 of the internal combustion engine of the embodiment 7, air flow along an axial line B is more stablized in the inlet pipe 41 by the straightening action of the plurality of straightening members 51, and the air flow amount sensing element 45 in the measuring pipe 43 can more accurately measure the amount of the intake air flowing in the inlet pipe 41.

Embodiment 8

Figure 12:
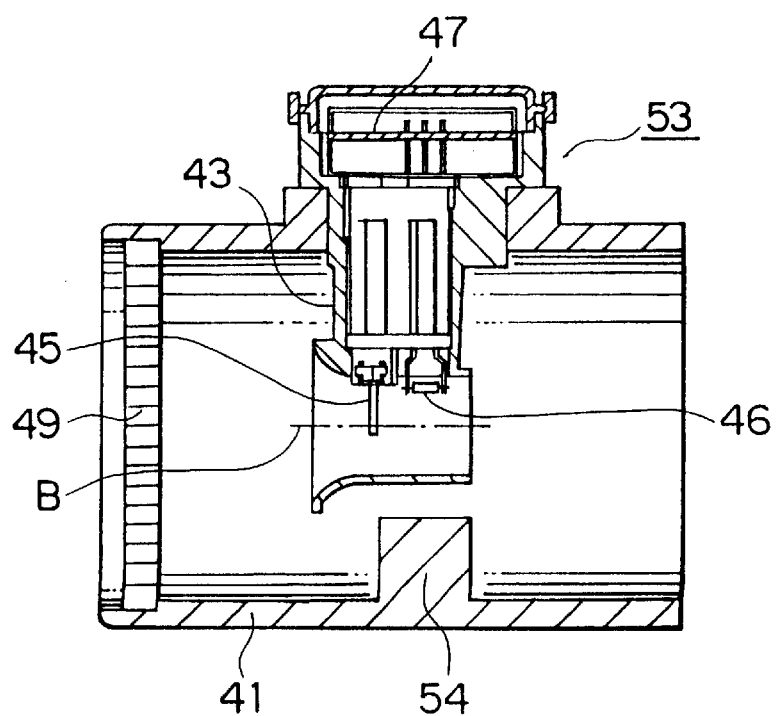
FIG. 12 is a side sectional view of an inlet system of an internal combustion engine of an embodiment 8.

FIG. 12 is a side sectional view of the main portion of an inlet system 53 of an internal combustion engine of embodiment 8 of the present invention. In the inlet system 53 of the internal combustion engine, since an upstream edge of a sheet-like straightening member 54 is disposed by being deflected downstream of an upstream end of a measuring pipe 43, the surface area of the straightening member 54 is smaller than that of the straightening member 48 of the embodiment 6 which is disposed over the entire length of the measuring pipe 43. As a result, the area of the straightening member 54 which comes into contact with the intake air flowing in the inlet pipe 41 is reduced, and the frictional resistance of the straightening member 54 to the intake air is reduced accordingly, so that the pressure loss of the intake air flowing in the inlet pipe 41 can be lowered.

Embodiment 9

Figure 13A:
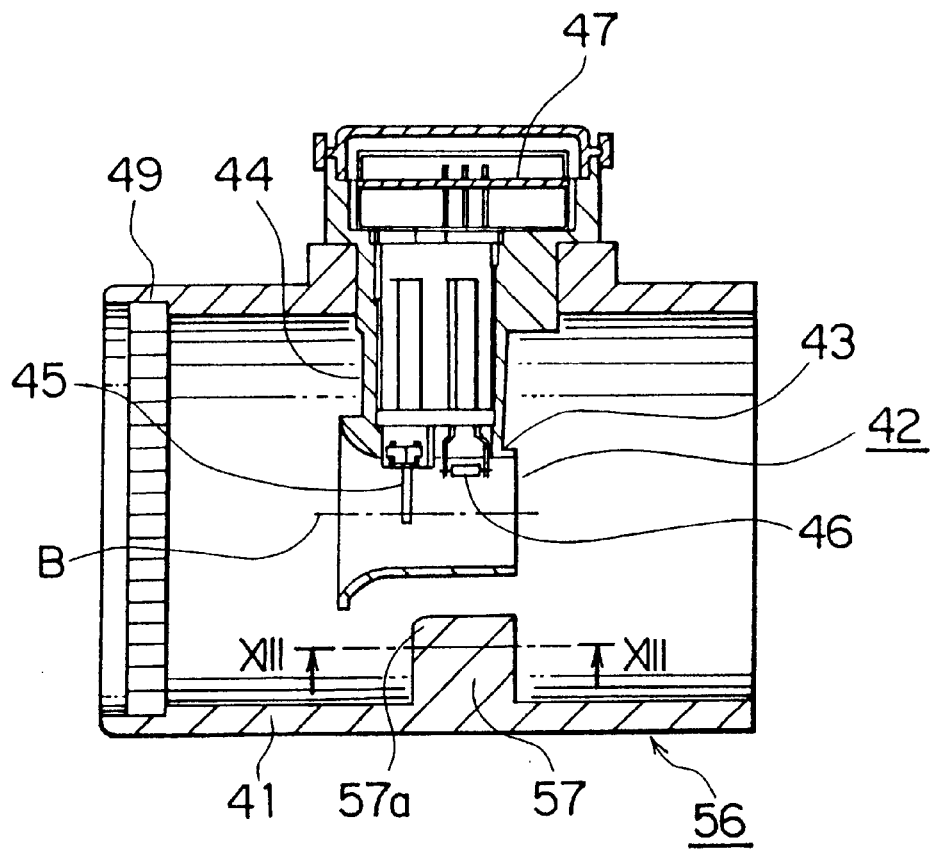
FIG. 13(a) is a side sectional view of an inlet system of an internal combustion engine of an embodiment 9.
Figure 13B:
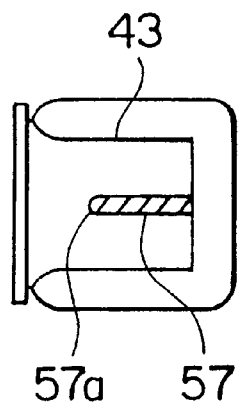
FIG. 13(b) is a sectional view of the inlet system of the internal combustion engine taken along the line XIII—XIII of FIG. 13(a)

FIG. 13(*a*) is a side sectional view of an inlet system 56 of an internal combustion engine of embodiment 9 of the present invention, and FIG. 13(*b*) is a sectional view taken along the line XIII—XIII of FIG. 13(*a*). In the drawings, the corner 57*a* of a straightening member 57 on the upstream side thereof is formed as a curved surface. As a result, intake air which collides against the corner 57*a* of the straightening member 57 smoothly flows along the curved corner 57*a*, so that the pressure loss of the intake air flowing in an inlet pipe 41 can be lowered.

Embodiment 10

Figure 14:
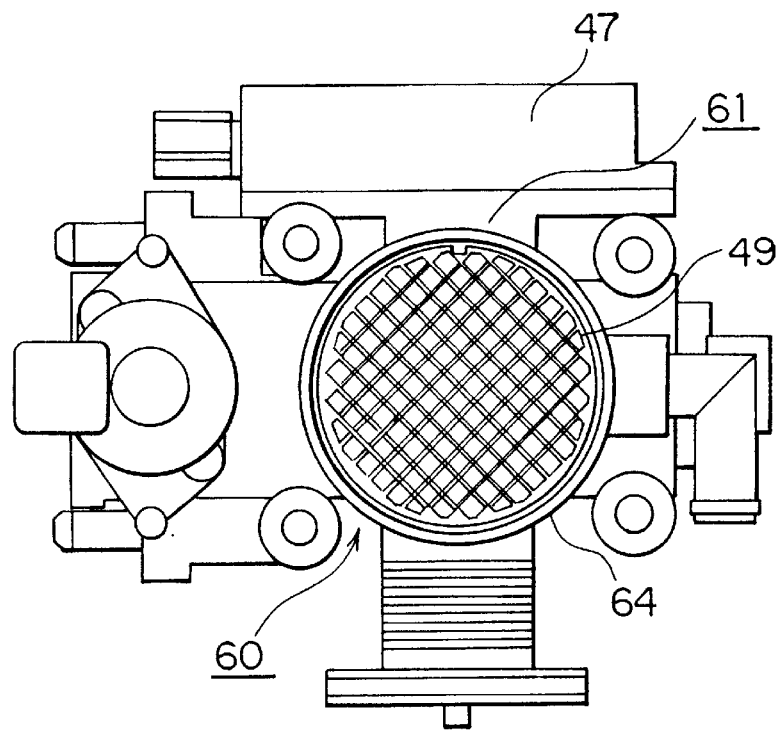
FIG. 14 is a front elevational view of an inlet system of an internal combustion engine of an embodiment 10 viewed from the upstream side.
Figure 15:
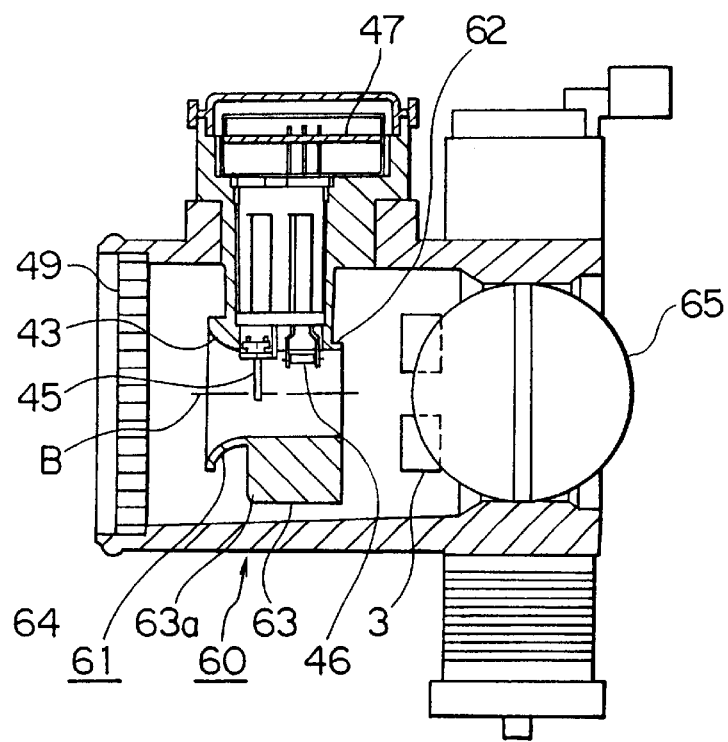
FIG. 15 is a side sectional view of the inlet system of the internal combustion engine shown in FIG. 14.
Figure 16:
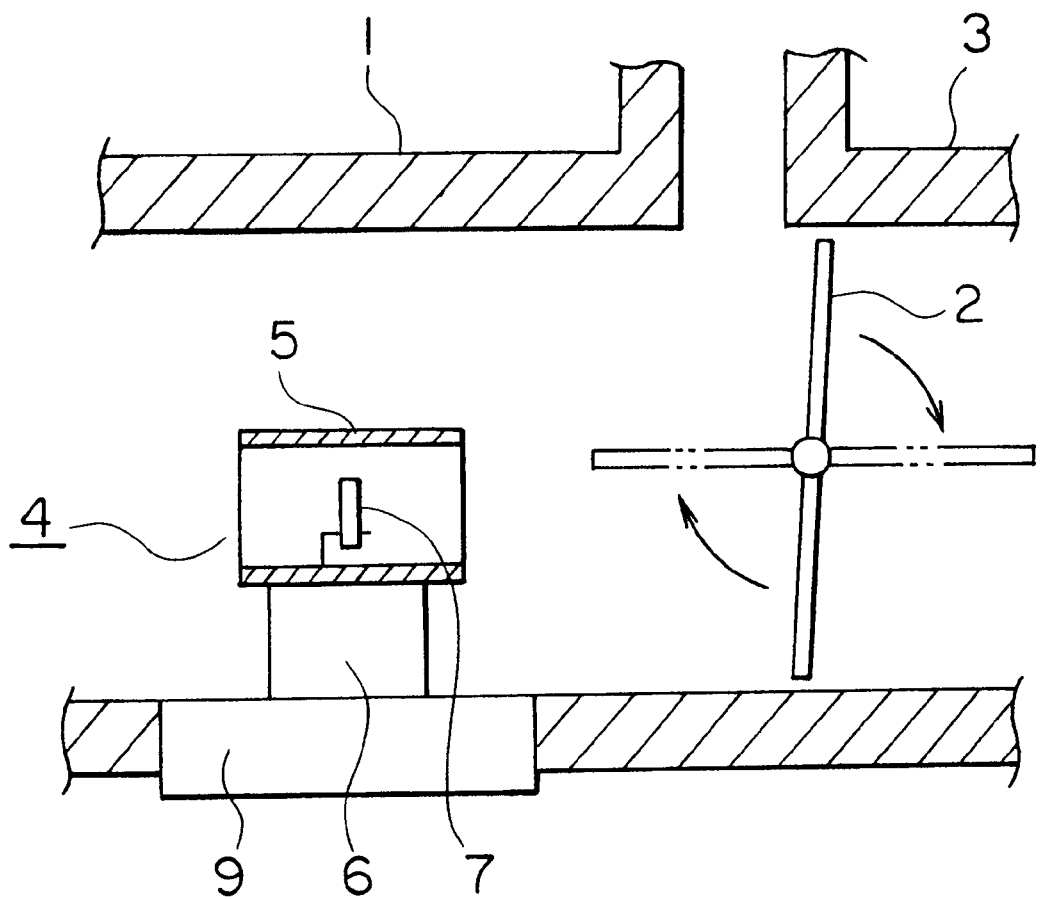
FIG. 16 is a sectional view of the main portion of a conventional inlet system of an internal combustion engine.

FIG. 14 is a front elevational view of an inlet system 60 of an internal combustion engine of an embodiment 10 of the present invention and FIG. 15 is a side sectional view of FIG. 14.

The inlet system 60 of the internal combustion engine includes an inlet pipe 64; a heat sensitive flow amount sensor 61 disposed on the inlet pipe 64, and a throttle valve 65 disposed on the inlet pipe 64 in the vicinity of the heat sensitive flow amount sensor 61.

A rectangular straightening member 63, which extends along the axial line B of the measuring pipe 62 of a heat sensitive flow amount sensor 61, is disposed on the outer peripheral surface of the measuring pipe 62. An upstream edge of the straightening member 63 is disposed downstream of an upstream end of the measuring pipe 62, and a corner 63*a* of the straightening member 63 on the upstream side thereof is formed as a curved surface.

In the embodiment 10, although a throttle valve 65 provided in the inlet pipe 64 is located in the vicinity of the measuring pipe 62, the heat sensitive flow amount sensor 61 can accurately measure the amount of the intake air flowing in the intake pipe 64 because it is barely affected by the disturbance of the air flow caused by the throttle valve 65.

Further more, since an upstream edge of the straightening member 63 is disposed downstream of an upstream end of the measuring pipe 62, the surface area of the straightening member 63 is reduced. The frictional resistance of the straightening member 63 to the intake air is reduced accordingly and the corner 63*a* thereof on the upstream side is formed as a curved surface; the intake air smoothly flows along the corner 63*a* and the pressure loss of the intake air can be lowered.

As described above, since the heat sensitive flow amount sensor according to one aspect of the present invention comprises: the measuring pipe disposed in the main pipe, the flow amount detecting element disposed in the measuring pipe for detecting the amount of a gas flowing in the main pipe, and the straightening member disposed on the measuring pipe along the axial line of the measuring pipe for straightening the gas flowing into the measuring pipe by straightening the gas flowing in the main pipe, it is difficult for the air flow amount sensing element to be affected by the disturbance of the gas. Thus, the amount of the gas flowing in the main pipe can be more accurately measured.

According to one form of the heat sensitive flow amount sensor, since a plurality of the straightening members are disposed at intervals in the peripheral direction of the measuring pipe, the gas flowing in the measuring pipe is straightened. Therefore, the flow amount of the gas in the main pipe can be more accurately measured.

According to another form of the heat sensitive flow amount sensor, since an upstream edge of the straightening member is a downstream of an upstream end of the measuring pipe, the surface area of the straightening member is reduced and the frictional resistance of the straightening member against the gas flowing thereon is reduced. Thus, the pressure loss of the gas flowing in the main pipe can be lowered.

According to still another form of the heat sensitive flow amount sensor, since the corner of the straightening member on the upstream side thereof is formed as a curved surface, the gas smoothly flows along the surface of the corner. Thus, the pressure loss of the gas flowing in the main pipe can be lowered.

Since the inlet system of the internal combustion engine according to another aspect of the present invention comprises: the inlet pipe in which intake air flows, the measuring pipe disposed in the inlet pipe, the air flow amount detecting element disposed in the measuring pipe for detecting the flow amount of the intake air flowing in the inlet pipe, and the straightening member disposed inside of the inlet pipe along the axial line of the measuring pipe for straightening the intake air flowing into the measuring pipe by straightening the intake air flowing in the inlet pipe. Air flows in the inlet pipe along the axial line by the straightening action of the straightening member. As a result, since it is difficult for the air flow amount detecting element in the measuring pipe to be affected by the disturbance of the air flow, the size of the internal combustion engine can be reduced while securing measuring accuracy of the flow amount of the air.

According to one form of the inlet system of an internal combustion engine, since a plurality of the straightening members are disposed at intervals in the peripheral direction of the inlet pipe, the air flow is further straightened in the measuring pipe. Thus, the flow amount of the air in the inlet pipe can be more accurately measured.

According to another form of the inlet system of the internal combustion engine, since an upstream end of the straightening member is disposed downstream of an upstream end of the measuring pipe, the surface area of the straightening member is reduced and the frictional resistance of the straightening member against the inlet air flowing thereon is reduced. Thus, the pressure loss of the intake air flowing in the inlet pipe can be lowered.

According to a still another form of the inlet system of the internal combustion engine, since the corner of the straightening member on the upstream side thereof is formed as a curved surface, the intake air smoothly flows at the corner along 'the surface thereof. Thus, the pressure loss of the intake air flowing in the intake pipe can be lowered.

According to a yet another form of the inlet system of the internal combustion engine, since the throttle valve is disposed in the inlet pipe in the vicinity of the measuring pipe, the size of the internal combustion engine can be reduced.

What is claimed is:

1. A heat sensitive flow amount sensor, comprising:
    a measuring pipe disposed in a main pipe and supported in said main pipe by a support member so that said measuring pipe is disposed generally in the center of said main pipe in the radial direction of said main pipe, said measuring pipe having a longitudinal axis parallel to a longitudinal axis of said main pipe;
    a flow amount detecting element disposed in said measuring pipe for detecting the amount of a gas flowing in the main pipe; and
    at least one flow straightening member provided in the annular region between said measuring pipe and said main pipe, and extending along the longitudinal axis of said measuring pipe, said flow straightening member straightening the gas flowing into said main pipe and thereby also straightening the gas flowing into said measuring pipe.

2. A heat sensitive flow amount sensor according to claim 1, wherein said at least one flow straightening member is a plurality of flow straightening members spaced apart from each other in a peripheral direction of said measuring pipe.

3. A heat sensitive flow amount sensor according to claim 1, wherein an upstream edge of said flow straightening member is disposed downstream of an upstream end of said measuring pipe.

4. A heat sensitive flow amount sensor according to claim 1, wherein an upstream edge of said flow straightening member is curved.

5. An inlet system of an internal combustion engine, comprising:
    an inlet pipe in which intake air flows;
    a measuring pipe disposed in said inlet pipe and supported in said inlet pipe by a support member so that said measuring pipe is disposed generally in the center of said inlet pipe in the radial direction of said inlet pipe, said measuring pipe having a longitudinal axis parallel to a longitudinal axis of said inlet pipe;
    an air flow amount detecting element disposed in said measuring pipe for detecting the flow amount of the intake air flowing in said inlet pipe; and
    at least one flow straightening member provided in the annular region between said inlet pipe and said measuring pipe, and extending along the longitudinal axis of said measuring pipe, said straightening member straightening the intake air flowing into said inlet pipe and thereby also straightening the intake air flowing into said measuring pipe.

6. An inlet system of an internal combustion engine according to claim 5, wherein said at least one flow straightening member is a plurality of flow straightening members spaced apart from each other in a peripheral direction of said inlet pipe.

7. An inlet system of an internal combustion engine according to claim 5, wherein an upstream edge of said flow straightening member is disposed downstream of an upstream end of said measuring pipe.

8. An inlet system of an internal combustion engine according to claim 5, wherein an upstream edge of said flow straightening member is curved.

9. An inlet system of an internal combustion engine according to claim 5, further comprising a throttle valve disposed in said inlet pipe adjacent to said measuring pipe.

10. A heat sensitive flow amount sensor according to claim 1, wherein said support member is positioned on an opposite side of said measuring pipe from said flow straightening member, the width of said flow straightening member in a direction perpendicular to the axis of said measuring pipe being smaller than the width of said support member in said direction, and the length of said flow straightening member in the radial direction of said measuring pipe being shorter than the length of said support member in the radial direction.

11. A heat sensitive flow amount sensor according to claim 2, wherein said support member and said flow straightening members are equally spaced from each other.

12. A heat sensitive flow amount sensor according to claim 1, wherein said at least one flow straightening member comprises one or more plate-shaped members provided on an outer circumference of said measuring pipe so as to be substantially parallel with the longitudinal axis thereof.

* * * * *